Oct. 16, 1951 C. W. KINNEAR Re. 23,416

DRILL

Original Filed Jan. 2, 1942 3 Sheets-Sheet 1

INVENTOR.
Clarence W Kinnear.

BY

E. V. Hardway,
ATTORNEY.

DRILL

Original Filed Jan. 2, 1942 3 Sheets-Sheet 2

INVENTOR.
Clarence W Kinnear.
BY
By E. V. Hardway.
ATTORNEY

DRILL

Original Filed Jan. 2, 1942

INVENTOR.
Clarence W. Kinnear
By E. V. Hardway
ATTORNEY.

Reissued Oct. 16, 1951

Re. 23,416

UNITED STATES PATENT OFFICE 23,416

DRILL

Clarence Wellington Kinnear, Houston, Tex.

Original No. 2,380,112, dated July 10, 1945, Serial No. 425,408, January 2, 1942. Application for reissue June 7, 1946, Serial No. 674,941

18 Claims. (Cl. 255—71)

Matter enclosed in heavy brackets [ ] appears in the original patent but forms no part of this reissue specification; matter printed in italics indicates the additions made by reissue.

This invention relates to new and useful improvements in a rotary drill bit.

An object of the invention is to provide a drill bit to be used in rotary drilling of oil wells, or deep water wells or the like, said drill bit having cutting elements thereon for the penetration of the earth and suitable for either hard rock, shale, or tough sticky earth formation drilling.

Another object of the invention is to provide a rotary drill bit of the type above referred to, with outer roller cutting elements being so constructed and arranged to cut a furrow or groove in the earth formation around the outer bottom periphery of the well hole to weaken the remaining portion of the earth formation on the inner bottom part of the hole to be easily cut or torn up by other cutting elements arranged and provided for that purpose during initial hole drilling operations.

A further object of the invention is to provide a rotary drill bit of the character described having outer lower roller cutting elements extending outwardly and downwardly from the vertical central axis of the bit frame or body, and positioned on the outside of the frame or body of the bit, and having other cutting elements underneath the frame or body of the bit.

A further object of the invention is to provide a rotary drill bit of the character described having a frame or body larger on the upper portion with a suitable connecting means for a drill stem, and a centralized thinner or lesser dimension on the lower portion for the attachment of the cutting elements.

A further object of the invention is to provide a rotary drill bit of the character described having roller cutting elements thereon and being so designed that the weight of the drill stem will shear the earth formation from the cutting teeth and from between the cutting teeth on the roller cutting elements as the drill bit is rotated and forced through the earth.

A further object of the invention is to provide a rotary drill bit of the character described having flushing fluid courses so positioned and directed as to permit the flushing fluid to flush across the forward faces of the cutting elements cutting the inner bottom portion of the well hole and at the same time blast the earth formation at the bottom of the hole near the bottom side of the roller cutting elements cutting the outer bottom portion of the well hole.

A further object of the invention is to provide a rotary drill bit of the character described having roller cutting elements with a series of serrations or cutting teeth and a series of crotches spaced between the cutting teeth, and another series of cutting edges within the crotches between the teeth.

A further object of the invention is to provide a rotary drill bit of the character described having a thin scrape or fish tail like blade with longitudinal slots, and having bearing pins or axles spanning the slots and welded to the thin blade on each side of the slots, and with roller cutting elements adapted to rotate about the pins.

A further object of the invention is to provide a rotary drill bit of the character described having roller cutting elements mounted on anti-frictional bearing assemblies.

A further object of the invention is to provide a rotary drill bit of the character described with roller cutting elements having a series of spaced cutting teeth with a series of associated crotches spaced between the cutting teeth, and with the lower part of the crotches sharpened and shaped ridge like for splitting the chip or cuttings so that weight applied from the drill stem will aid in shearing earth cuttings from between the cutting teeth, away from the crotches and force the cuttings up and away from the roller cutters during drilling operation.

*Finally, it is one of the primary objects of the present invention to provide a drilling tool of the character described embodying a novel combination of a fish tail type of drill for drilling through soft formation that would adhere to toothed rolling cutters and impede the progress thereof with specially designed rolling cutters that will readily penetrate hard formation which could not be efficiently penetrated by a fish tail drill working alone, thereby producing a drilling tool that will efficiently operate under all conditions encountered in well drilling.*

These and other objects of the invention will in part be obvious and will in part be more fully disclosed in the accompanying drawings which show by illustration three embodiments of the invention, in which.

The invention will be better understood from a detailed description thereof wherein like numerals denote like parts in the accompanying drawings of the present embodiments of the invention.

Figure 1:
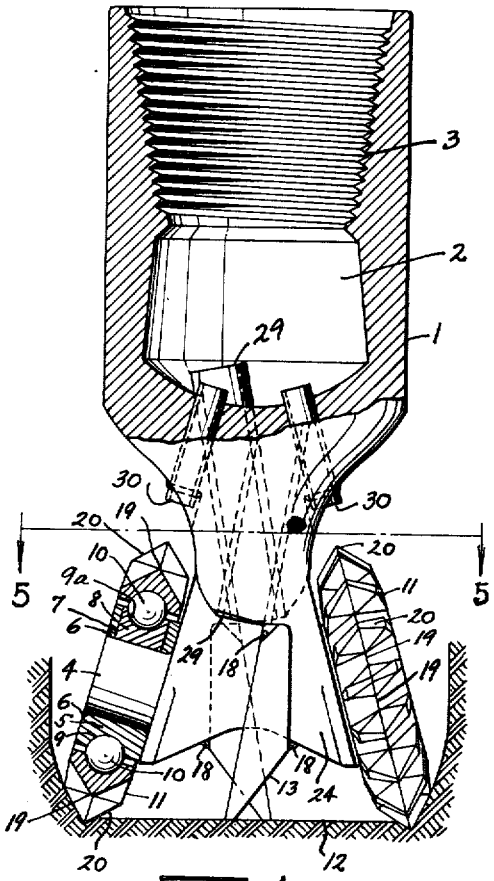
Figure 1 is a vertical side view partly sectional of the drill bit with the cutting elements mounted thereon, and positioned at the bottom of a well hole.
Figure 6:
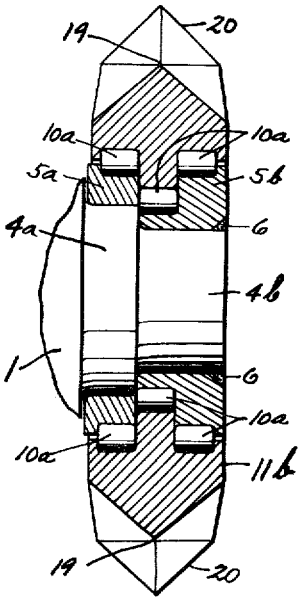
Figure 6 is a side view partly sectional of a roller cutter assembly mounted on an axle pin showing the application of cylindrical type antifrictional bearings.
Figure 8:
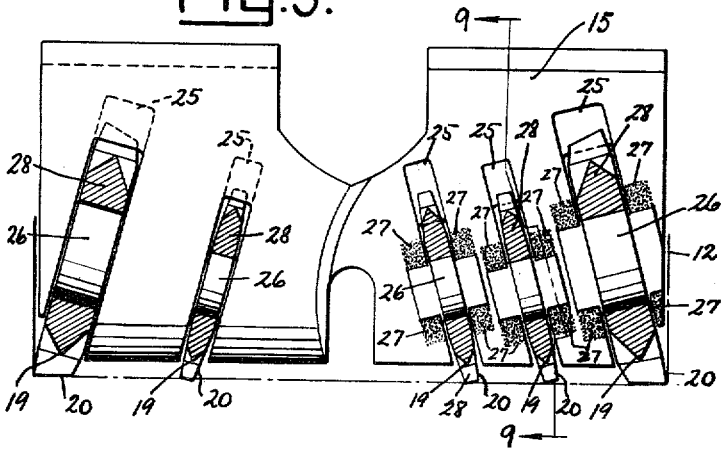
Figure 8 is a vertical side view partly sectional showing another embodiment of the drag type blade having roller cutter assemblies attached thereon, and adapted to cut the full gauge of the well hole to be drilled.
Figure 9:
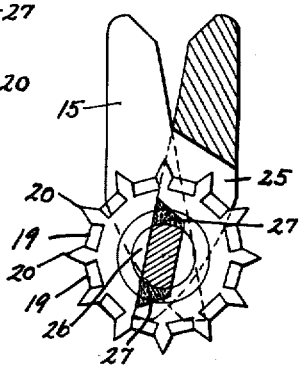
Figure 9 is a section taken through section line 9—9 of Figure 8, showing a roller cutter assemby mounted on the drag type bit blade and being turned at 90 degrees to Figure 8.
Figure 10:
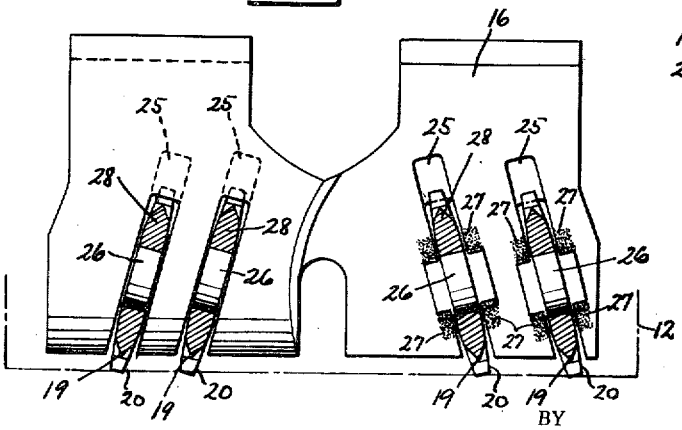
Figure 10 is a vertical side view of a drag type bit blade showing roller cutter assemblies partly sectional attached thereon, and adapted to cut a lesser gauge than the full gauge of the hole to be drilled.

The numeral 1 designates the frame or body of the bit which has an interior cavity 2 formed in the upper end thereof, said cavity being provided with a threaded portion 3 to receive a drill stem. The middle and lower part of the bit body narrows down to a lesser dimension forming a downwardly extending central shank. This downwardly extending central shank is somewhat enlarged on its lower portion and has outwardly and upwardly extending axle pins 4 thereon. Races 5 are fitted on the axle pins 4 and secured thereto by welding material 6. These races in Figure 1, and Figure 11, have antifrictional bearing assembly holes 7 in which are placed bearing retaining plugs 8 with race grooves 9 in the races and race grooves 9a in the retaining plugs for retaining ball bearings 10 which are adapted to rotate about the races; however the races and bearing applications are different as shown in Figure 6. It being understood that any well known bearing and race application could be used. In Figure 6, the axle pin is of larger diameter adjacent the bit body 1 at 4a and of smaller diameter on the outer end 4b. A larger diameter race 5a is fitted on axle pin portion 4a and race 5b is fitted on axle pin portion 4b and secured thereto by welding material 6. Cylindrical antfrictional bearings 10a are mounted on the races 5a and 5b and are adapted to rotate about said races. The middle set of cylindrical antifrictional bearings rotate about a race surface of lesser diameter than the two outer sets of cylindrical antifrictional bearings.

Figure 2:
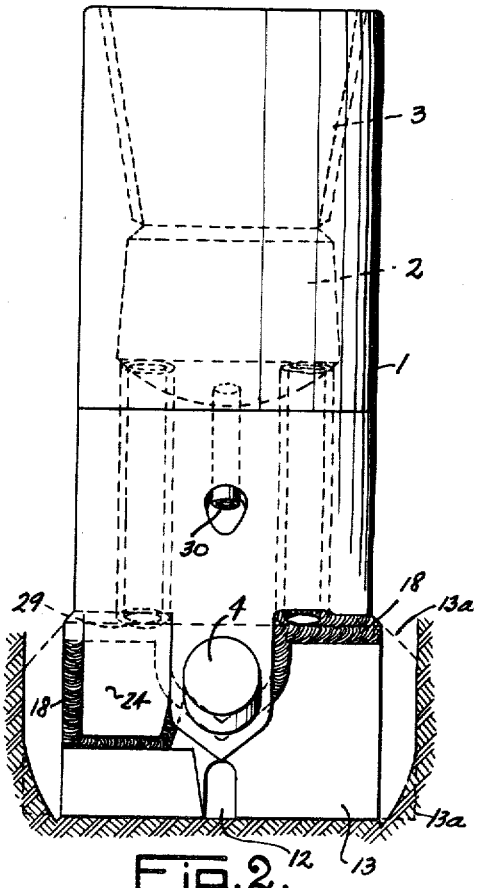
Figure 2 is a vertical side view of the drill bit body turned at 90 degrees to Figure 1, showing the drag type bit blade welded to the body, and positioned at the bottom of a well hole.
Figure 3:
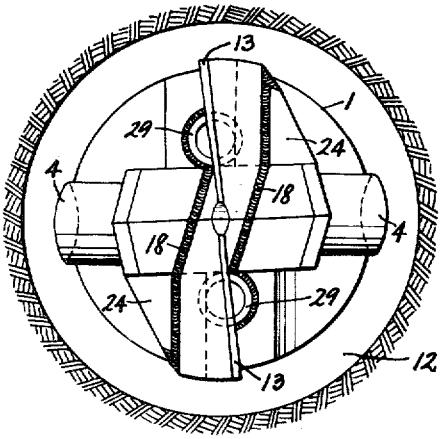
Figure 3 is a bottom plan view of the bit body shown in Figure 1, with the drag type blade welded thereon, and positioned in a well hole.
Figure 4:
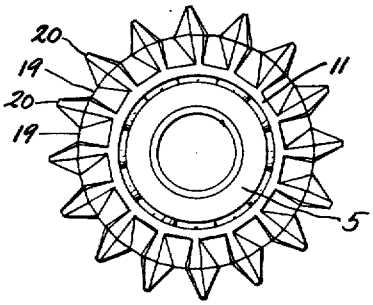
Figure 4 is a side view of one of the outer roller cutters mounted on an antifrictional bearing assembly as shown in Figure 1.
Figure 5:
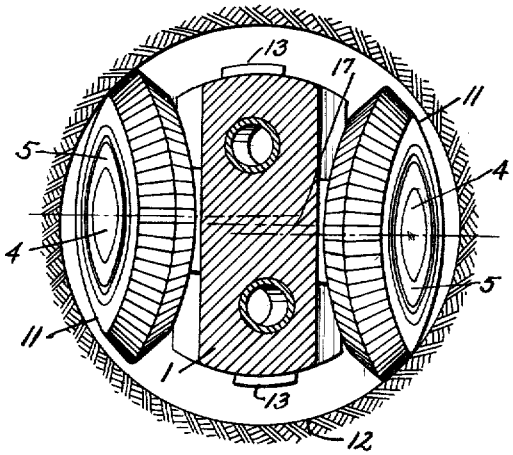
Figure 5 is a cross section through section line 5—5 of Figure 1, showing the lower part of the bit body with cutting elements thereon and positioned in a well hole.
Figure 7:
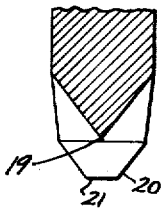
Figure 7 is a sectional side view of a roller cutter cutting tooth with the outer cutting point dubbed and sharpened.
Figure 11:
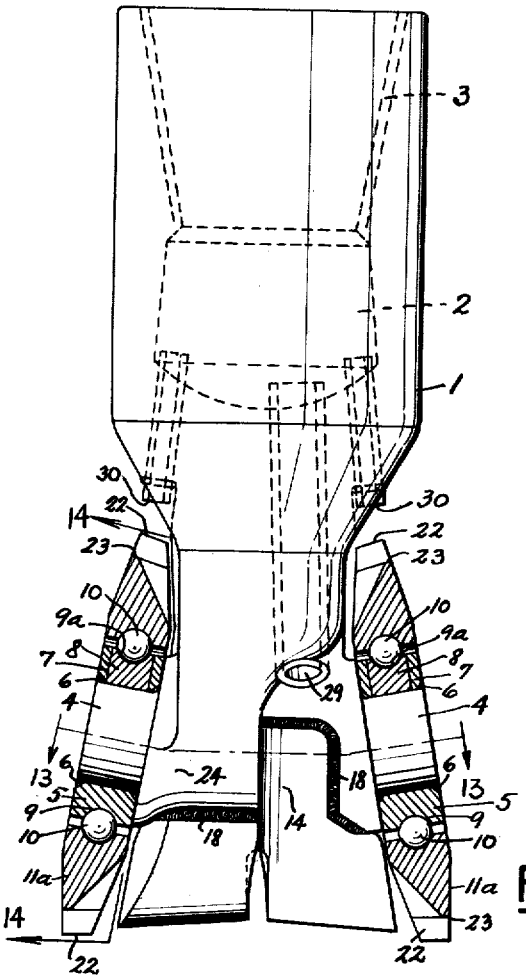
Figure 11 is a vertical side view partly sectional of another embodiment of the drill bit.
Figure 12:
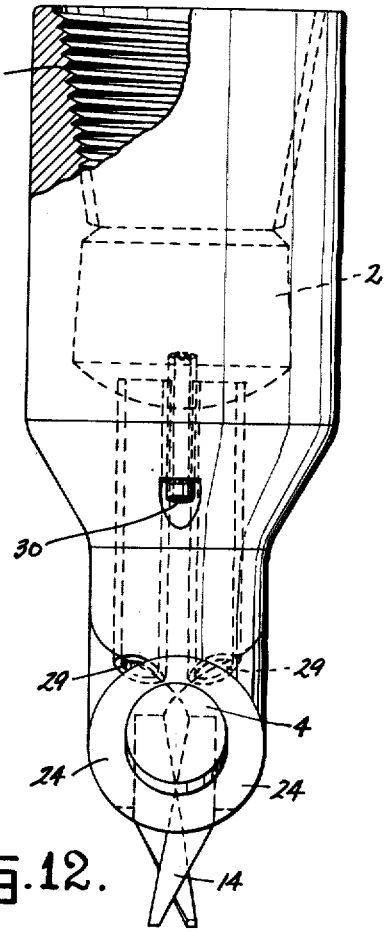
Figure 12 is a vertical side view partly sectional of the drill bit body with drag type blade attached thereto and turned at 90 degrees to Figure 11.
Figure 13:
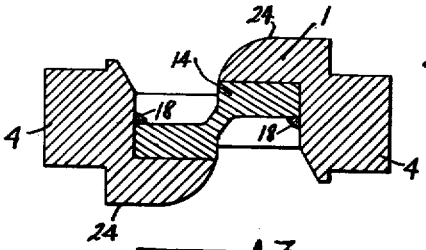
Figure 13 is a cross section of the drill bit body and drag type blade taken through section line 13—13 of Figure 11.
Figure 14:
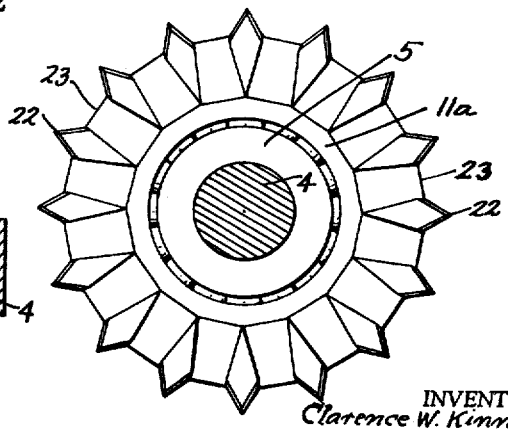
Figure 14 is a vertical side view partly sectional showing a roller cutter mounted on an antifrictional bearing assembly, and attached to an axle pin and being taken through section line 14—14 of Figure 11.

Cutting elements forming the cutting portion of the drill bit are of different forms and character and are placed at different positions and angles with respect to each other in different embodiments of the invention to meet the requirements of drilling in different localities of the earth. These cutting elements consist in different embodiments of the invention of outer bottom roller cutters 11, 11a, and 11b to be used for cutting the outer bottom parts of well hole 12, and inner bottom cutting elements 13, 13a, 14, 15, and 16 to be used for cutting the inner bottom part of well hole 12, which are attached by welding 18 to either one of the bit bodies. Different inner bottom cutting elements are selected to suit the substance being drilled. The inner bottom cutting elements 13, 14, and 16 are adapted to cut a lesser gauge than the full gauge of well hole 12 while the inner bottom cutting elements 13a, and 15 are adapted to cut the full gauge of hole 12. It being shown in Figure 2, that drag blade 13 could easily be extended wider at 13a to cut the full gauge of the hole. Hard surface material may be attached to any or all of the cutting elements or bearing surfaces in the well known manner. The outer bottom roller cutters are mounted on antifrictional bearings as shown and situated to lean inwardly at the top and outwardly at the bottom, and to rotate about said bearings and exteriorly of the frame or body of the bit which will help prevent debris or cuttings from clogging or stopping the rotation of said roller cutters. The axis of the axle pins 4 about which the outer bottom roller cutters are adapted to rotate are each oppositely set forward of the diametrical center line 17 of the drill bit as shown in Figure 5, thus allowing the outer bottom roller cutters to cut the gauge of the hole on the forward outer side bottom portion of said roller cutters during rotating operation and also allowing clearance between the well hole gauge and the back and lower portion of the outer bottom roller cutters during rotation; however, the axis of the axle pins could be placed on the diametrical center line of the bit if desired. Cutting teeth and crotches between said cutting teeth on the roller cutters shown are of unique design and are very important as the weight of the drill pipe will aid in shearing the debris or cuttings from the cutting teeth, and from the crotches between the cutting teeth during drilling operation. In Figures 1, 4, 6, 7, 8, 9, and 10 the roller cutters all have spaced sharpened ridge like cutting edges 19 centrally located within the crotches between the spaced cutting teeth 20 for splitting the chip or cuttings. In Figure 7, the cutting tooth is somewhat dubbed off and sharpened on the outer cutting point 21. In Figures 11 and 14, the roller cutters 11a have spaced cutting teeth 22 with spaced sharpened ridge like cutting edges 23 within the crotches between said cutting teeth. The spaced sharpened cutting edges 23 are situated to one side of the center of the spaced cutting teeth 22 for forcing the main portion of the chips or cuttings toward the inner part of the well hole during drilling operation.

The construction of the inner bottom cutting elements are of different design as aforestated, and are placed adjacent to blade supports 24 of the bit body and firmly welded thereto as shown, thereby taking a great part of the downward thrust off of the outer roller cutting elements when drilling. Inner bottom cutting elements 13, 13a, and 14 are of the fish tail drag type blade, and inner bottom cutting elements 15, and 16 are drag type blades having slots 25 therein with axle pins 26 positioned across said slots and embedded in and secured to said blades 15, and 16, by welding material 27. Roller cutters 28 are mounted on axle pins 26 and adapted to rotate about said axle pins, and through said slots 25.

Large fluid course ducts 29 and smaller fluid course ducts 30 extend through the drill bit body and communicate with the interior of a drill stem (not shown) whereby flushing fluid forced through said drill stem is adapted to wash debris and cuttings from the cutting elements of the drill bit during drilling operation.

In the operation of the drill bit a suitable drill stem is attached to the threaded portion thereof and the device is rotated and fed forward into the earth. As the drill rotates the roller cutting elements rotate about their respective axle pins and cut deepened grooves in the earth formation within their path of rotation and the drag type cutting elements cut or tear the remaining portion of the earth formation within their path of movement. The roller cutters being of extraordinary design cut chips or cuttings from the bottom of the well hole and the chips or cuttings caught in the crotches between the cutting teeth of the roller cutters are forced from the crotches and out into the open hole by the aid of the weight of the drill stem urging the cutting teeth to slice through the earth and to take hold of other chips or cuttings. Flushing fluid is forced through the drill stem into the bit body, and emerges through the fluid course ducts for washing debris and cuttings from the drill bit. The large fluid course ducts are so positioned on the bit body with respect to the cutting elements that they are adapted to wash down the front cutting faces of the inner cutting elements and blast the bottom of the well hole near where the outer roller cutters are taking their portion of the cut with the same direct blast. It being remembered that flushing fluid under high pressure will dislodge and cut a great amount of the cuttings from the bottom of the well hole. This position of these fluid course ducts with respect to the cutting elements, and with respect to their emerging on the exterior surface and well upon the outside surface of the bit body are of extreme importance as this allows the flushing fluid to directly blast cuttings away from the outer side periphery of the bit body, directly blast down the front faces of the inner cutting elements, directly blast along the side of the outer bottom roller cutters, and directly blast the bottom of the well hole in the rear proximity of where the inner bottom cutting elements and the outer bottom roller cutters take their respective cuts in the substance being drilled. The smaller fluid course ducts directly blast the cutting teeth on the outer bottom roller cutters as the said teeth on the cutters rotate past the port holes of said smaller fluid course ducts during drilling operation.

It is obvious that many changes may be made in the details of construction and arrangement of parts by one skilled in the art without departing from the scope of the invention.

[Having thus described the invention, what I claim as new and desire to secure by Letters Patent is:]

*What I claim is:*

[1. A rolling cutter for use in well drills comprising, a disc-like body having on its periphery cutting teeth terminating in outwardly directed cutting edges and spaced apart so as to leave notches, or depressions, between the cutting teeth, that portion of the notches, or depressions, forming the body of the rolling cutters, being beveled so as to form sharp cutting edges extending circumferentially of the disc-like body, the cutting edges of the teeth extending radially further than the circumferential cutting edges of the notches.]

[2. A rolling cutter for use in well drills comprising, a disc-like body having on its periphery cutting teeth spaced apart so as to leave notches between the cutting teeth, that portion of the notches, forming the body of the rolling cutter, being beveled so as to form cutting edges extending, approximately, circumferentially of the disc-like body, the cutting edges of the teeth extending radially further than the circumferential cutting edges of the notches.]

*3. A rotary drilling tool comprising, a body having means at its upper end for connecting a drill stem thereto and whose lower portion is reduced in thickness, forming opposite side faces, and terminating in oppositely arranged cutting blades, a spindle on each side face, a rolling cutter on each spindle adjacent the corresponding side face, said body having channels leading therethrough and positioned to direct streams of flushing fluid between the forward faces of the blades and the adjacent sides of the respective rolling cutters and against the bottom of the well bore.*

*4. A rotary drilling tool comprising, a body having means at its upper end for the connection of a drill stem thereto and whose lower portion is reduced in thickness so as to form side faces on opposite sides of said reduced portion, the lower end of the reduced portion being formed into a blade arranged to operate against the bottom of the bore, said blade merging in side reaming margins arranged to ream the bore to gauge, a spindle on each side face of the body, a rolling cutter on each spindle, the rolling cutters being of dimensions and position to penetrate into the virgin earth deeper than, and in front of, the lower portions of the corresponding reaming margins.*

*5. A rotary drilling tool comprising, the combination with a fishtail type of drill having a shank which terminates in a blade having a forward cutting edge to operate against the bottom of a well bore and side reaming edges adapted to ream the bore, spindles anchored to opposite sides of said blade, rolling cutters on the spindles set at angles to the vertical axis of the drill to operate against the outer bottom portion of the bore in advance of the lower portions of the respective reaming edges.*

*6. A rotary drilling tool comprising, the combination with a fishtail type of drill having a substantially flat shank which terminates in a forward cutting edge to operate against the bottom of a well bore and side reaming edges adapted to ream the bore to gauge, spindles anchored to opposite sides of said shank, rolling cutters on the spindles set at angles to the vertical axis of the drill to operate against the outer bottom portion of the bore in advance of the lower portions of the respective reaming edges.*

*7. A rotary drilling tool comprising, the combination with a fishtail type of drill having a body whose lower portion is reduced in thickness form-* ing a shank with approximately flat faces on opposite sides and terminating at its forward end in a cutting edge to operate against the bottom of a well bore, and having reaming edges at its side margins, said body, shank and cutting and reaming edges forming a unitary structure, upwardly diverging spindles, one on each side face of, and formed integrally with the shank, rolling cutters mounted on the spindles and set at angles to the vertical axis of the drill to operate against the outer bottom portion of the bore in advance of the lower portion of the respective reaming edges.

8. A rotary drilling tool comprising, the combination of a drill having a body provided with means at the upper end thereof for the connection of a drill stem thereto, the middle and lower portion of the body being narrowed down to a lesser dimension forming a downwardly extended central shank whose lower end terminates in a forward cutting edge to operate against the bottom of a well bore and having side reaming edges adapted to ream the bore to gauge, upwardly diverging axle pins anchored to the outer sides of the shank, one on each side thereof and approximately midway between said reaming edges, rolling cutters mounted on said axle pins and set at angles to the vertical axis of the drill to operate against the outer bottom portion of the bore in advance of the lower outer portions of the respective reaming edges.

9. A rotary drilling tool comprising, the combination with a fishtail type of drill having a body whose upper end is formed for the connection of a drill stem thereto and whose lower portion is reduced in diameter forming a shank having side faces on opposite sides thereof and whose lower end terminates in oppositely directed cutting blades whose lower, or forward, ends have cutting edges adapted to operate against the bottom of a well bore, the outer margins of said blades being formed with reaming edges to ream the sidewalls of the bore, upwardly diverging spindles one on each side of the shank and anchored thereto, rolling cutters mounted to rotate about the respective spindles, the inner side of each rolling cutter being adjacent the rear face of one of said blades and being spaced from the corresponding forward face of the other blade to form channels between the rolling cutters and the opposing forward faces of the cutter blades, said body having passageways leading therethrough and terminating in the upper ends of said channels through which flushing fluid from the drill stem may be forced between the forward faces of said blades and the opposing sides of the rolling cutters and delivered against the bottom of the well bore.

10. A rotary drilling tool comprising, the combination of a drill having a body provided with means at the upper end thereof for the connection of a drill stem thereto, the middle and lower portion of the body being narrowed down to a lesser dimension forming a downwardly extended shank whose lower end terminates in a forward cutting edge to operate against the bottom of a well bore and having side reaming edges adapted to ream the bore to gauge, upwardly diverging axle pins anchored to the shank, one on each side thereof and approximately midway between said reaming edges, rolling cutters mounted on said axle pins and set at angles to the vertical axis of the drill to operate against the outer bottom portion of the bore, said body having passageways leading therethrough and positioned to direct streams of flushing fluid between the sides of the shank and the adjacent sides of the respective rolling cutters and against the bottom of the well bore.

11. A rotary drilling tool comprising, a body having means at its upper end for the connection of a drill stem thereto and whose lower portion is reduced in thickness so as to form side faces on opposite sides of said reduced portion, the lower end of the reduced portion being formed into a blade arranged to operate against the bottom of the bore, said blade merging in side reaming margins arranged to ream the bore to gauge, a spindle on each side face of the body, said body, shank, blade and spindles forming a unitary structure, a rolling cutter on each spindle, the rolling cutters being of dimensions and positioned to penetrate into the virgin earth in front of the corresponding reaming margins.

12. A rotary drilling tool comprising, the combination of a drill having a body provided with means at its upper end for the connection of a drill stem thereto and having a blade at its lower end to operate against the bottom of the bore and provided with side faces, spindles anchored to the opposite side faces of the body and having free ends which diverge upwardly, rolling cutters mounted to rotate about the spindles and being of dimensions and positioned to operate against the outer bottom portion of the bore, said body having water courses therethrough positioned to direct streams of flushing fluid between the said side faces of the body and the adjacent sides of the respective rolling cutters and against the bottom of the well bore.

13. A rotary drill bit adapted to be attached to a drill stem comprising a body having an upper portion and a lower portion, said lower portion having a plurality of outer roller cutters mounted thereon in circularly spaced relation from one another to cut in substantially the same circular path defining the outer bottom part of a well hole, said lower portion having cutting elements mounted thereon within the path of travel of said outer roller cutters and circularly spaced in trailing relationship thereto to cut the inner bottom part of the well hole at substantially the same level as the cut taken by said outer roller cutters, a pair of fluid course ducts extending through said body to communicate with the interior of the drill stem, said ducts terminating in downwardly directed discharge ends spaced outwardly from the center line of the bit and positioned forwardly of said cutting elements and rearwardly of said outer roller cutters in the direction of rotation of the bit, said discharge ends being positioned and directed to discharge streams of high pressure fluid directly against the well bottom adjacent to the trailing sides of said outer roller cutters, said lower portion of said bit being reduced providing open spaces between said cutting elements and said outer roller cutters below said discharge ends whereby unimpeded streams of high pressure fluid from said discharge ends of said ducts may directly blast the bottom of the well hole adjacent to the bottom sides of said outer roller cutters during the drilling operation.

14. A rotary drill bit adapted to be attached to a drill stem comprising a body having an upper portion and a lower portion, said lower portion having a plurality of outer roller cutters mounted for rotation thereon in circularly spaced relation with respect to one another and to cut in substantially the same circular path defining the

*outer bottom part of a well hole, said lower portion having cutting elements thereon within the path of travel of said outer roller cutters and circularly spaced in trailing relationship thereto to cut the inner bottom part of the well hole at substantially the same level as the cut taken by said outer roller cutters, a pair of fluid course ducts extending through said body to communicate with the interior of the drill stem, said ducts terminating in downwardly directed discharge ends located in the lower portion of said body between said cutting elements and said outer roller cutters and below the upper ends of the latter, said discharge ends being positioned and directed outwardly from the center line of the bit to discharge streams of high pressure fluid directly against the bottom of the well adjacent to the bottom sides of said outer roller cutters, said lower portion being reduced providing open spaces between said cutting elements and said outer roller cutters below said discharge ends whereby unimpeded streams of high pressure fluid from said discharge ends of said ducts may directly blast the bottom of the well hole adjacent to the bottom sides of said outer roller cutters during the drilling operation.*

*15. A rotary drill bit adapted to be attached to a drill stem comprising a body having an upper portion and a lower portion, said lower portion having a plurality of outer roller cutters mounted for rotation thereon in circularly spaced relation with respect to one another and to cut in substantially the same circular path defining the outer bottom part of a well hole, said lower portion having cutting elements thereon within the path of travel of said outer roller cutters and circularly spaced in trailing relationship thereto to cut the inner bottom part of the well hole at substantially the same level as the cut taken by said outer roller cutters, a pair of fluid course ducts extending through said body to communicate with the interior of the drill stem, said ducts terminating in downwardly directed discharge ends located between said cutting elements and said outer roller cutters below the upper ends of the latter and adjacent to the center of rotation of said outer roller cutters, said lower portion being reduced providing open spaces between said cutting elements and said outer roller cutters below said discharge ends whereby unimpeded streams of high pressure fluid from said discharge ends of said ducts may directly blast the bottom of the well hole adjacent to the bottom sides of said outer roller cutters during the drilling operation.*

*16. A rotary drill bit adapted to be attached to a drill stem comprising a body having an upper portion and a lower portion, said lower portion having a plurality of outwardly and upwardly directed spindles thereon and outer roller cutters on said spindles in circularly spaced relation with respect to one another to cut in substantially the same circular path defining the outer bottom part of a well hole, said lower portion having cutting elements thereon within the path of travel of said outer roller cutters to cut the inner bottom part of the well hole at substantially the same level as the cut taken by said outer roller cutters, a pair of fluid course ducts extending through said body to communicate with the interior of the drill stem, said ducts terminating in downwardly directed discharge ends in the lower portion of said body at substantially the level of said spindles and between said cutting elements and said outer roller cutters, said discharge ends being positioned and directed outwardly from the center line of the bit to discharge streams of high pressure fluid directly against the bottom of the well adjacent to the bottom sides of said outer roller cutters, said lower portion being reduced providing open spaces between said cutting elements and said outer roller cutters below said discharge ends whereby unimpeded streams of high pressure fluid from said discharge ends of said ducts may directly blast the bottom of the well hole adjacent to the bottom sides of said outer roller cutters during the drilling operation.*

*17. A rotary drilling tool comprising, a body having means at its upper end for connecting a drill stem thereto and whose lower portion is reduced in thickness, forming opposite side faces, and terminating in oppositely arranged cutting blades, a spindle on each side face, a rolling cutter on each spindle adjacent the corresponding side face, said body having channels leading therethrough terminating in discharge ends located between said blades and the adjacent sides of the respective rolling cutters, said discharge ends being positioned to discharge the flushing fluid outwardly anad blast directly against the bottom of the well adjacent to the cutting portions of said rolling cutters.*

*18. A hydraulic rotary deep well drill for attachment to a drill stem including a body having a downwardly extending reduced shank with opposite broad faces terminating in oppositely arranged cutting blades, a spindle on each broad face, a roller cutter on each spindle, a pair of fluid courses extending through said body which communicate with the interior of the drill stem and terminate in downwardly directed discharge ends offset from the central axis of the drill, the discharge ends of said fluid courses being positioned between respective blades and roller cutters in the direction of rotation of the drill and in sufficient proximity to the bottom end of the drill to direct a concentrated blast of flushing fluid under high pressure between said blades and roller cutters to blast substantially on the outer bottom portion of the well hole.*

*19. A rotary drilling tool comprising a bit body having means at its upper end for the connection of a drill stem thereto and whose lower portion is reduced in thickness, forming opposite side faces, and terminating in oppositely arranged cutting blades, a spindle on each side face, a rolling cutter on each spindle adjacent the corresponding side face, said rolling cutter comprising a cutter body, cutting teeth on the periphery of the cutter body and spaced apart therearound so as to form notches between the teeth, cutting edges on the cutter body within said notches, the cutting teeth projecting out further than the cutting edges, the cutting teeth having cutting edges which form, substantially, continuations of the cutting edges in the notches, thus providing a rolling cutter having a sharpened periphery throughout the circumference thereof, said bit body having channels leading therethrough and positioned to deliver streams of flushing fluid between the forward faces of the blades and the adjacent sides of the respective rolling cutters and directly against the bottom of the well bore.*

*20. A rotary drill bit adapted to be attached to a drill stem including a body portion with a cutting portion thereon, said cutting portion consisting of a plurality of outer roller cutters for cutting the outer bottom part of a well hole and*

*a drag type blade having roller cutters thereon for cutting the inner bottom part of the well hole, said drag type blade having slots therein, axle pins positioned across said slots and mounted on said drag type blade, said last named roller cutters adapted to rotate about said axle pins and through said slots, fluid course ducts extending through said drill bit and communicating with the interior of said drill stem whereby flushing fluid forced through said drill stem is adapted to wash debris and cuttings from said cutting portion of the drill bit during drilling operation.*

CLARENCE WELLINGTON KINNEAR.

REFERENCES CITED

The following references are of record in the file of this patent or the original patent:

UNITED STATES PATENTS

| Number | Name | Date |
|---|---|---|
| 1,136,203 | Bardeen | Apr. 20, 1915 |
| 1,152,151 | Decker | Aug. 31, 1915 |
| 1,656,022 | Scott | Jan. 10, 1928 |
| 1,850,358 | Scott | Mar. 22, 1932 |
| 1,874,066 | Scott et al. | Aug. 30, 1932 |
| 1,879,127 | Schlumpf | Sept. 27, 1932 |
| 2,049,543 | Kammerer | Aug. 4, 1936 |
| 2,175,471 | Krick et al. | Oct. 10, 1939 |
| 2,198,849 | Waxler | Apr. 30, 1940 |
| 2,208,530 | Thompson | July 16, 1940 |
| 2,235,548 | Bozeman | Mar. 18, 1941 |
| 2,244,537 | Kammerer | June 3, 1941 |
| 2,260,487 | Scott | Oct. 28, 1941 |

Certificate of Correction

Reissue No. 23,416 October 16, 1951

CLARENCE WELLINGTON KINNEAR

It is hereby certified that error appears in the printed specification of the above numbered patent requiring correction as follows:

Column 5, line 60, for "rear" read near ; column 10, line 26, for "*anad*" read *and*;

and that the said Letters Patent should be read as corrected above, so that the same may conform to the record of the case in the Patent Office.

Signed and sealed this 1st day of April, A. D. 1952.

[SEAL]

THOMAS F. MURPHY,
*Assistant Commissioner of Patents.*